(12) United States Patent
Seo (10) Patent No.: US 7,289,412 B2
(45) Date of Patent: Oct. 30, 2007

(54) ADAPTIVE RECORDING CONTROL METHOD AND APPARATUS FOR HIGH DENSITY OPTICAL RECORDING

(75) Inventor: Jin-gyo Seo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 09/995,828

(22) Filed: Nov. 29, 2001

(65) Prior Publication Data

US 2002/0101808 A1    Aug. 1, 2002

(30) Foreign Application Priority Data

Nov. 29, 2000  (KR) ............................. 2000-71717

(51) Int. Cl.
   *G11B 5/09*   (2006.01)
(52) U.S. Cl. .................... 369/59.11; 369/47.5; 369/116
(58) Field of Classification Search ............ 369/59.11, 369/59.12, 116, 47.53, 47.51, 47.52, 47.5
   See application file for complete search history.

(56) References Cited

U.S. PATENT DOCUMENTS

| | | | | |
|---|---|---|---|---|
| 5,825,742 A | * | 10/1998 | Tanaka et al. ............... | 369/116 |
| 5,956,313 A | * | 9/1999 | Maegawa et al. ......... | 369/53.26 |
| 6,160,784 A | * | 12/2000 | Maeda et al. ............... | 369/116 |
| 6,188,656 B1 | * | 2/2001 | Shoji et al. ............... | 369/47.25 |
| 6,343,056 B2 | * | 1/2002 | Miyamoto et al. ........ | 369/59.11 |
| 6,359,846 B1 | * | 3/2002 | Shoji et al. ................. | 369/47.5 |
| 6,396,792 B1 | * | 5/2002 | Ichihara ....................... | 369/116 |
| 6,400,673 B1 | * | 6/2002 | Shigemori ................... | 369/116 |
| 6,407,976 B2 | * | 6/2002 | Nagara et al. .............. | 369/116 |
| 6,678,228 B1 | * | 1/2004 | Kando et al. ............. | 369/47.51 |
| 6,731,586 B2 | * | 5/2004 | Seo et al. .................... | 369/116 |
| 6,738,339 B2 | * | 5/2004 | Gyo ........................ | 369/53.26 |
| 6,762,986 B1 | * | 7/2004 | Seo .......................... | 369/59.12 |
| 6,934,235 B2 | * | 8/2005 | Seo .......................... | 369/59.11 |
| 7,190,652 B2 | * | 3/2007 | Ogawa ..................... | 369/59.15 |
| 2005/0111314 A1 | * | 5/2005 | Kojima ....................... | 369/47.5 |

FOREIGN PATENT DOCUMENTS

KR    10-1998-29732    7/1998

\* cited by examiner

*Primary Examiner*—Tan Dinh
(74) *Attorney, Agent, or Firm*—Staas & Halsey LLP (57) ABSTRACT

An adaptive recording control method and apparatus independently controlling the power levels of a first pulse, a multi-pulse, and a last pulse. The adaptive recording control method of an optical recording medium, according to which a mark is formed using a multiple pulse train comprising a first pulse, a multi-pulse having a reference power level, and a last pulse, and the power levels of the first and last pulses are controlled in comparison with a reference power level of the multi-pulse depending on a correlation between a mark and a space between successive marks, setting the power level of the first pulse depending on the correlation between the mark and the space; setting the power level of the last pulse depending on the correlation between the mark and the space; and driving a recording unit by the multiple pulse train having the set power levels of the first and last pulses.

9 Claims, 12 Drawing Sheets

AP_type()=4
APPLY ADAPTIVE POWER
TO FIRST & LAST PULSES

AP_type()=5
APPLY ADAPTIVE POWER
TO FIRST & LAST PULSES

AP_type()=6
APPLY ADAPTIVE POWER
ONLY TO LAST PULSE

FIG. 2 (PRIOR ART)

FIG. 3A (BACKGROUND)

FIG. 3B (BACKGROUND)

ADAPTIVE RECORDING CONTROL METHOD AND APPARATUS FOR HIGH DENSITY OPTICAL RECORDING

CROSS-REFERENCE TO RELATED APPLICATIONS

This application claims the benefit of Korean Patent Application No. 2000-71717 filed on Nov. 29, 2000, in the Korean Industrial Property Office, the disclosure of which is incorporated herein by reference.

BACKGROUND OF THE INVENTION

1. Field of the Invention

The present invention relates to a recording method of high density optical recording, and more particularly, to an adaptive recording control method of independently controlling the power levels of a first pulse, a multiple pulse, and a last pulse used with optimum recording.

2. Description of the Related Art

Phase-change optical disks widely used as high density optical disks record digital signals using a recording layer in a liquid crystalline (melting) state which has the property of being able to exist in two different phases depending on the cooling rate: a crystalline phase and an amorphous phase. The temperature of the recording layer is adjusted by the power of a laser beam radiated thereon, and the cooling rate is controlled to be fast enough to result in an amorphous state, or slow enough to result in a crystalline state. That is, the phase-change optical disks record and erase digital information by adjusting the power of a laser beam incident on the recording layer and controlling the cooling rate.

In digital versatile disc-random access memories (DVD-RAMs) adopting eight to fourteen modulation plus (EFM+), marks on the recording medium representing recorded data have lengths of 3T to 11T or 14T where 1T denotes a clock period of the recording mark. Phase-change optical disks record data by mark edge recording or mark position recording. While mark edge recording allows for high density recording compared with mark position recording, it may degrade the quality of a recorded signal since a trailing edge, which is the end of a recording mark, tends to be larger than a leading edge, which is the beginning of the recording mark, thereby forming a teardrop shape.

In efforts to overcome the above problems, a method of forming a recording mark using a multiple pulse train has been proposed. The multiple pulse train comprises a first pulse, a multi-pulse, and a last pulse, wherein each pulse could have one of three levels, i.e., a peak power $P_w$, an erase power $P_e$, and a bias power $P_b$.

Figure 1A:
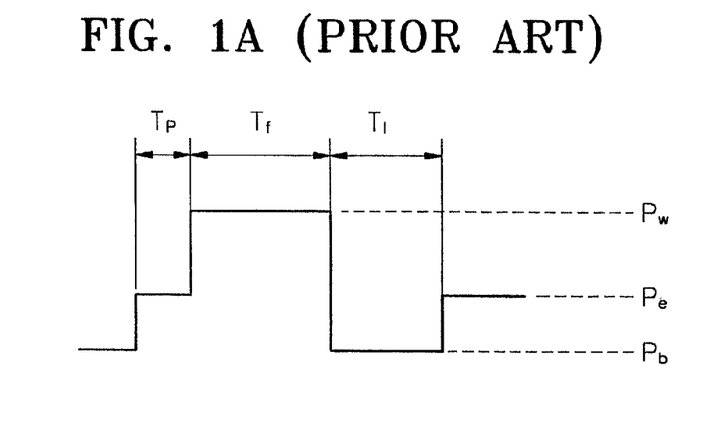
FIGS. 1A and 1B are waveforms of conventional multiple pulse trains corresponding to recording marks having lengths of 3T and 14T, respectively.
Figure 1B:
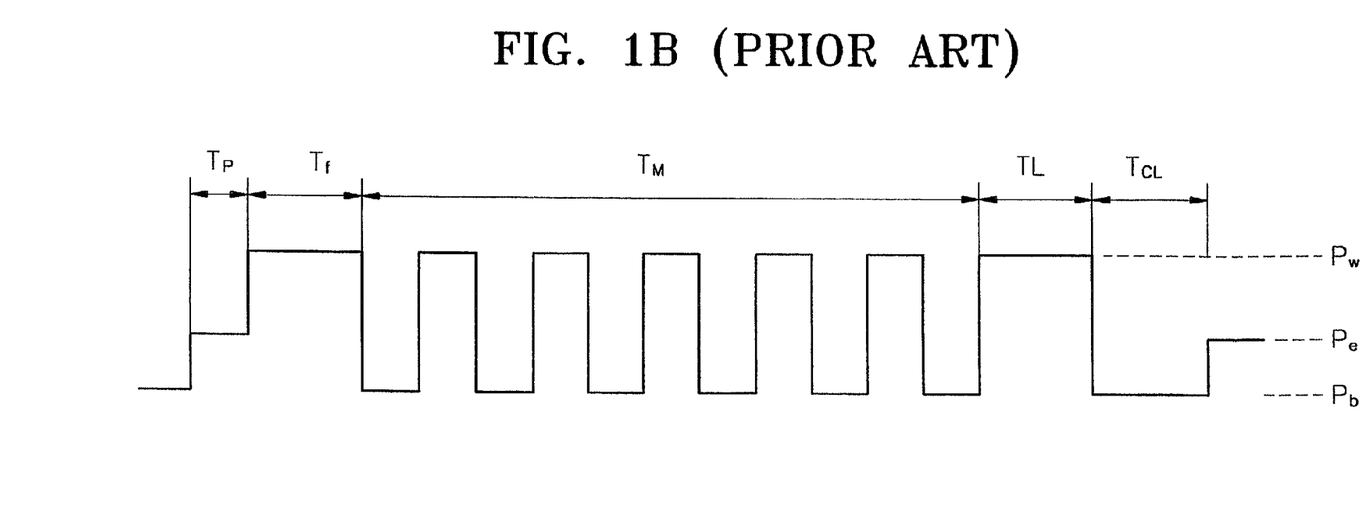

FIG. 1A is a waveform of a conventional multiple pulse train corresponding to a recording mark of a length of 3T. FIG. 1B is a waveform of a conventional multiple pulse train corresponding to a 14T recording mark. The waveforms shown in FIGS. 1A and 1B conform to 2.6 GB DVD-RAM standards.

As shown in FIG. 1A, the multiple pulse train forming a recording mark of 3T is divided into three pulse areas: a preheating pulse $T_p$, a first pulse $T_f$ and a last pulse $T_l$. As shown in FIG. 1B, the multiple pulse train forming a recording mark of 14T is divided into five pulse areas: a preheating pulse $T_p$, a first pulse $T_f$, a multi-pulse $T_m$, a last pulse $T_l$, and a cooling pulse $T_{cl}$. The preheating pulse $T_p$ has an erase power level of $P_e$ and is selectively set to erase previously written content and preheating a recording layer. The first pulse $T_f$ has a peak power level of $P_w$ to form the leading edge of a recording mark. The multi-pulse $T_m$ is applied between the first and last pulses $T_f$ and $T_l$ in forming a recording mark of 4T or greater, and cyclically alternates between the bias power level $P_b$ and the peak power $P_w$. The number of pulses constituting a multi-pulse $T_m$ corresponds to the length of the recording mark. The multi-pulse reduces non-uniformity of a long recording mark caused by thermal buildup. The last pulse $T_l$ has peak power level $P_w$ forming the trailing edge of a recording mark. The cooling pulse $T_{cl}$ has a bias power level $P_b$, at which the laser power is switched off to prevent the recording mark from being too long. Unlike a 2.6 GB DVD-RAM, the power level of cooling pulse $T_{cl}$ can be made different in a 4.7 GB DVD-RAM. That is, the temperature of a recording layer may be set to between 100-200° C. instead of room temperature during a cooling pulse $T_{cl}$ period.

Figure 2:
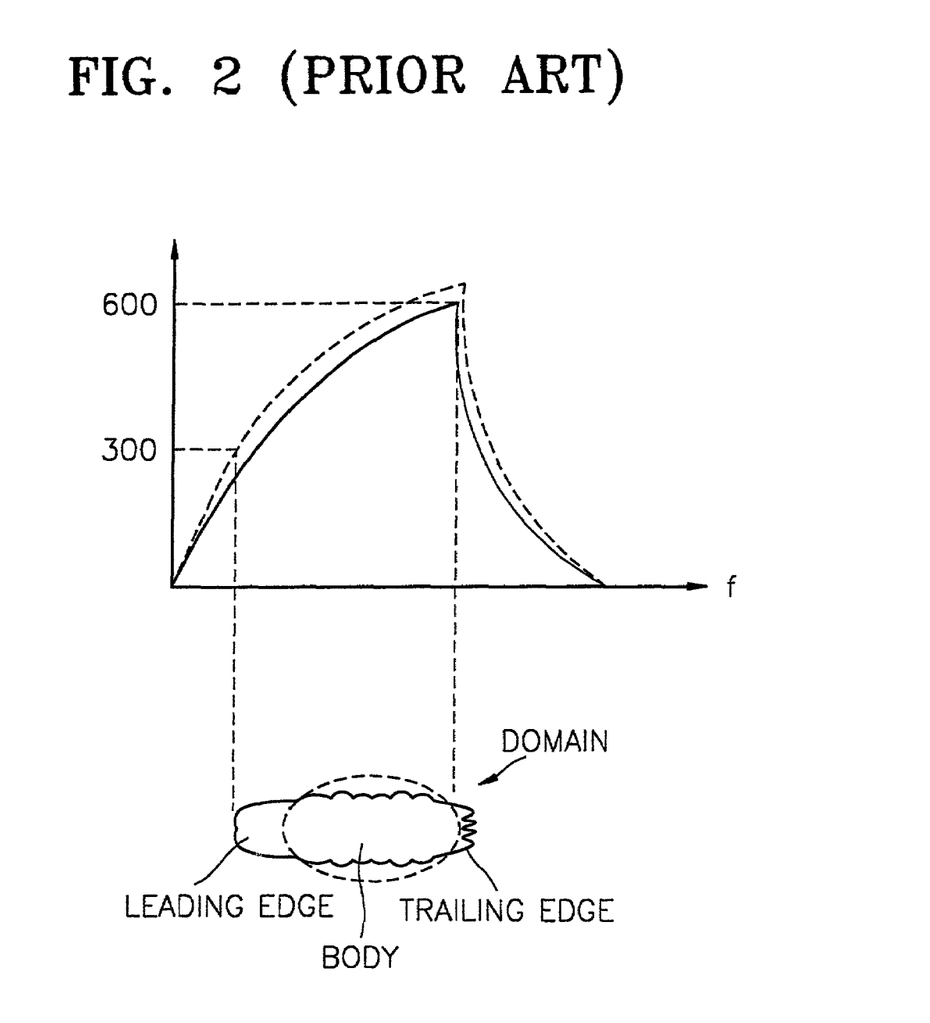
FIG. 2 shows the write characteristics of a phase-change optical disk recording medium.

FIG. 2 shows the write characteristics of a phase-change optical disk recording medium. In the phase change disk, recording of digital information is accomplished by melting a recording layer to be in a liquid crystalline state by applying heat and then cooling it to be in a crystalline or amorphous state. A laser diode is used to apply heat. The recording layer is typically in an erase state at about 300° C. and in a liquid crystalline state above 600° C.

As is evident from a graph at the upper part of FIG. 2, if the temperature of a recording layer is at about 300° C., the recording layer is in an erase state, in which previously recorded information is erased. If the temperature rises above 600° C., the recording layer is completely in a liquid crystalline (melting) state. Thereafter, desired digital information can be recorded by adjusting the cooling rate. Cooling is accomplished by natural cooling through a substrate supporting the recording layer after the power of the laser diode is lowered (in 4.7 GB DVD-RAM) or switched off (in 2.6 GB DVD-RAM).

The lower part of FIG. 2 shows the recording state of the recording medium with respect to changes in temperature as shown in the graph of FIG. 2. Information previously written on the recording layer is erased when the recording layer is in an erase state, whereas a domain corresponding to a recording mark is formed when it is in a liquid crystalline and cooling state. Here, the domain refers to a portion corresponding to a mark when viewed from above.

The shape of the domain significantly affects the quality of signals, in particular, jitter, cross erase and cross-talk. In particular, forming the beginning, the middle, and the end portions of a domain is significantly affected by changes in temperature of a recording layer. Unless the leading and trailing edges of a domain are smoothly formed, jitter increases. If the shape of a domain widens near the middle like the domain shown with a dotted line, cross erase occurs between adjacent tracks during recording, while cross-talk occurs between adjacent tracks during reproducing.

To prevent the domain from widening in the middle, intermittent pulses are continuously applied between the leading and trailing edges of the domain (multi-pulse). The multi-pulse prevents a mark from widening in the middle by reducing thermal buildup at the middle of the mark.

However there remains room for improving recording control so as to further increase signal quality as recording density increases.

SUMMARY OF THE INVENTION

Accordingly, it is an object of the present invention to provide an adaptive recording control method of high density recording.

It is another object of the present invention to provide an adaptive recording control apparatus used in high density recording.

Additional objects and advantages of the invention will be set forth in part in the description which follows and, in part, will be obvious from the description, or may be learned by practice of the invention.

The foregoing and other objects of the present invention are achieved by providing an adaptive recording control method of an optical recording medium, according to which a mark is formed using a multiple pulse train comprising a first pulse, a multi-pulse having a reference power level, and a last pulse, and the power levels of the first and last pulses are controlled with respect to a peak power level of the multi-pulse depending on a correlation between a mark and a space between successive marks, the method comprising: setting the power level of the first pulse depending on the correlation between the mark and the space; setting the power level of the last pulse depending on the correlation between the mark and the space; and driving a recording unit by the multiple pulse train having the set power levels of the first and last pulses.

The above and other objects of the present invention may also be achieved by providing an adaptive recording control apparatus, used with an optical recording medium, which forms a mark using a multiple pulse train comprising a first pulse, a multi-pulse having a peak power level $P_w$, and a last pulse, and controls the power levels of the first and last pulses with respect to a peak power level of the multi-pulse depending on a correlation between a mark and a space between successive marks. The adaptive recording control apparatus comprises: a non-return-to-zero inverted (NRZI) detector that receives an NRZI signal to detect correlation between a current mark and each of previous and next spaces; a pulse generator that generates power control signals including a read control signal, a peak control signal, and a bias control signal generating the multiple pulse train referring to the correlation detected by the NRZI detector and select control signals generated during intervals of the first and last pulses; an operation unit that feeds back the output of a laser diode, determines the peak power level $P_w$, and generates power level $P_{wh}$, which is higher than the peak power level $P_w$, and power level $P_{wl}$, which is lower than the peak power level $P_w$; and a multiplexer selectively outputting one of the power levels $P_{wh}$, $P_w$, and $P_{wl}$ output from the operational unit during the first or last pulse intervals in response to the select control signals.

The recording control method according to the present invention allows the power levels of a first pulse, a multi-pulse, and a last pulse to be controlled independently, thereby providing improved recording control.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Korean Patent Application No. 99-22916 entitled "Adaptive Recording Method for High Density Optical Reading, Controlling Method therefor, and Apparatus Using the same" filed on Jan. 18, 1999 by the applicant, discloses a method of controlling the power level of first and last pulses depending on a correlation between a recording mark and adjacent spacers where a spacer refers to an interval between successive marks. The invention disclosed in the above patent application is devised to improve recording quality, with respect to conventional methods, by making the shape of the leading and trailing edges of a domain smooth according to a correlation between a mark and a space.

For example, to smoothly form the leading edge of the domain, a method of increasing the speed at which the recording layer is switched to a liquid crystalline state can be used, as shown with the front portion of the dotted line in the graph of FIG. 2. To this end, the power level of a first pulse $T_f$ is made lower than a reference power level, which is the power level of a multi-pulse.

On the other hand, to smoothly form the trailing edge of the domain, as shown with the rear portion of the dotted line of the graph of FIG. 2, the power of a last pulse $T_l$ is increased thereby decreasing the rate at which the recording layer cools. For this purpose, the power level of the last pulse $T_l$ is made higher than the reference power level.

Figure 3A:
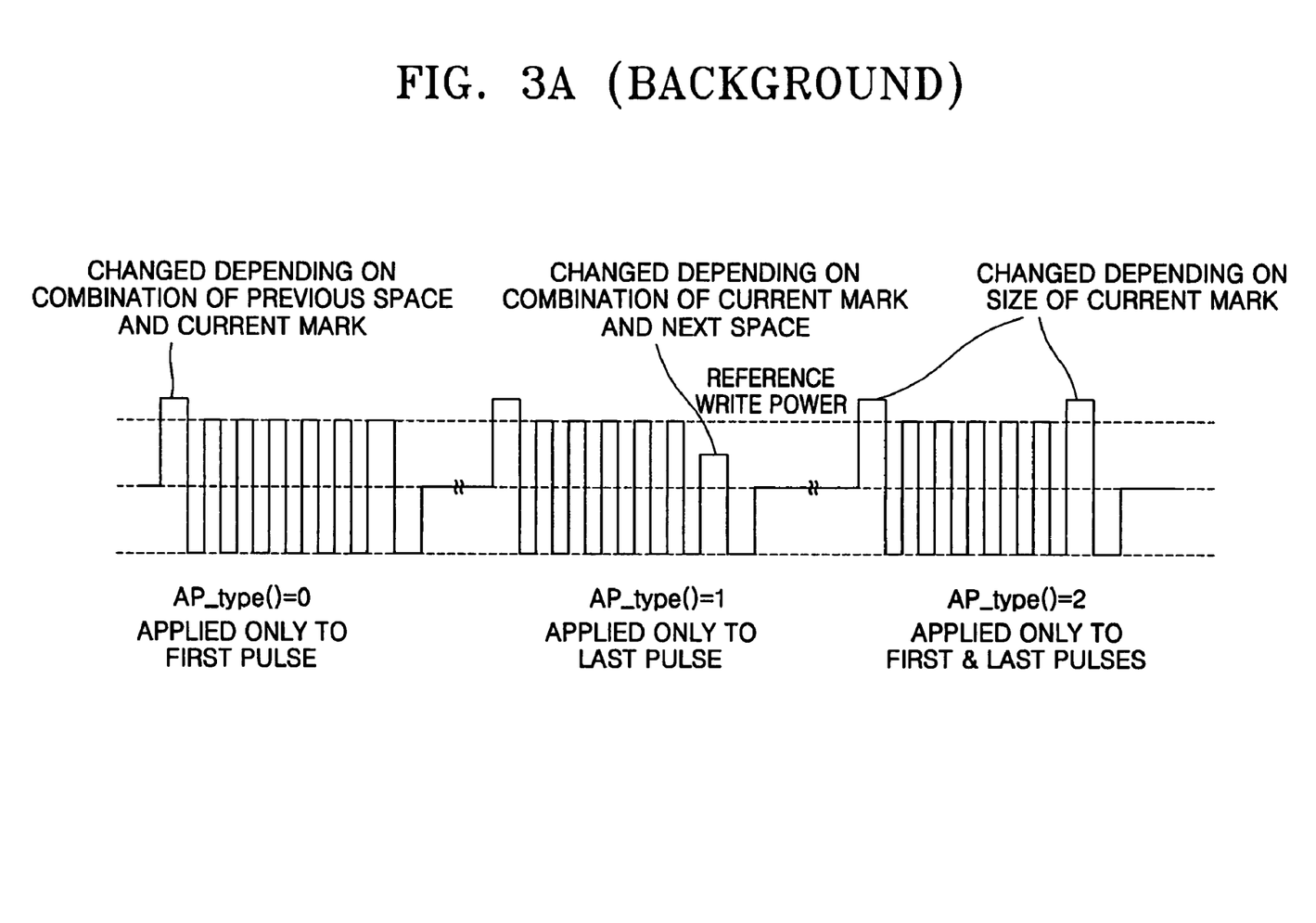
FIGS. 3A and 3B are waveforms of write pulses forming the domain shown in the lower part of FIG. 2.
Figure 3B:
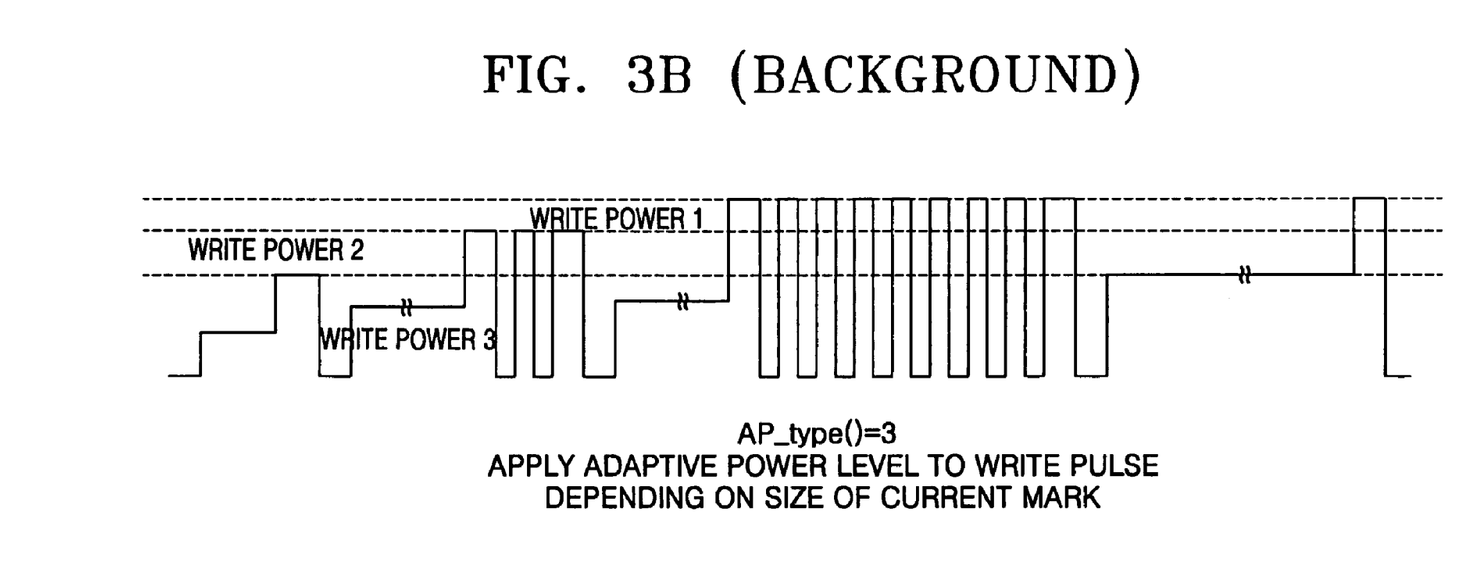

FIGS. 3A and 3B are waveforms of write pulses forming the domain as shown in the lower part of FIG. 2. Referring to FIG. 3A, in a first multiple pulse train, the power level of a first pulse is adjusted according to a combination of a previous space and a current mark. In a second multiple pulse train, the power level of a last pulse is adjusted depending on a correlation between a current mark and a next space. In a third multiple pulse train, the power levels of first and last pulses are adjusted depending on the size of a current mark regardless of a correlation between a mark and a space. Here, AP_type ( ) denotes the type of adaptive power level control method applied.

The power levels of first and last pulses are made higher than the peak power level $P_w$, which is a reference power level. In this way, the power levels of first and last pulses are adjusted depending on a correlation between a mark and a space, which is called an adaptive recording method.

Meanwhile, the peak power level $P_w$, which is the reference power level, may be controlled depending on the density of marks and spaces. FIG. 3B shows an example in which a reference power level, which is a reference write power level or a peak level, is adjusted depending on energy of a non-return-to-zero inverted (NRZI) signal. NRZI refers to a method of modulating recorded data for high density recording, in which a domain is formed on a recording medium in accordance with the waveform of an NRZI signal. Also, a mark and a space correspond to high and low levels of an NRZI signal, respectively.

As shown in FIG. 3B, the reference power level is any of peak powers 1, 2, and 3 depending on the energy of an NRZI signal.

As described above, Korean patent application No. 99-22916 discusses an adaptive recording method in which the power level of only a first pulse is adjusted depending on a correlation between a previous space and a current mark, the power level of only a last pulse is adjusted depending on a correlation between a current mark and a next space, or the power levels of first and last pulses are adjusted simultaneously regardless of a correlation between a mark and a space. This method may aid in high density recording.

Figure 4:
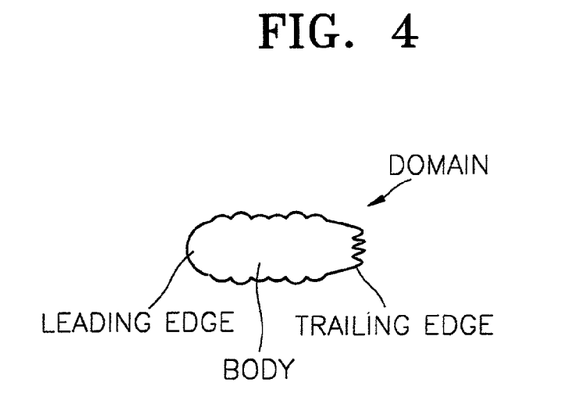
FIG. 4 shows the shape of a domain on a recording medium formed by a write pulse.

Referring now to the present invention, FIG. 4 shows a leading edge, a body, and a trailing edge of a domain. As is evident from FIG. 4, the shape of the leading edge is smooth, whereas that of the trailing edge is untidy. This is because cooling does not occur uniformly due to the temperature distribution of a recording layer and the characteristics of media in the course of giving off heat accumulated in the recording layer through a substrate. The problem cannot be solved completely since it is mainly caused by the characteristics of the media and can only be attenuated by controlling laser power.

Previously, it is difficult to control recording so that the trailing edge of a domain can be formed smoothly since either the first pulse $T_f$ or the last pulse $T_l$ is adjusted depending on a correlation between a mark and a space, or both first and last pulses $T_f$ and $T_l$ are adjusted regardless of this correlation.

Therefore, the present invention proposes a recording control method improving the quality of a recorded signal. In particular, the power level of a last pulse is controlled independent of the power level of a first pulse thereby making the shape of the trailing edge of a domain smooth.

Figure 5:
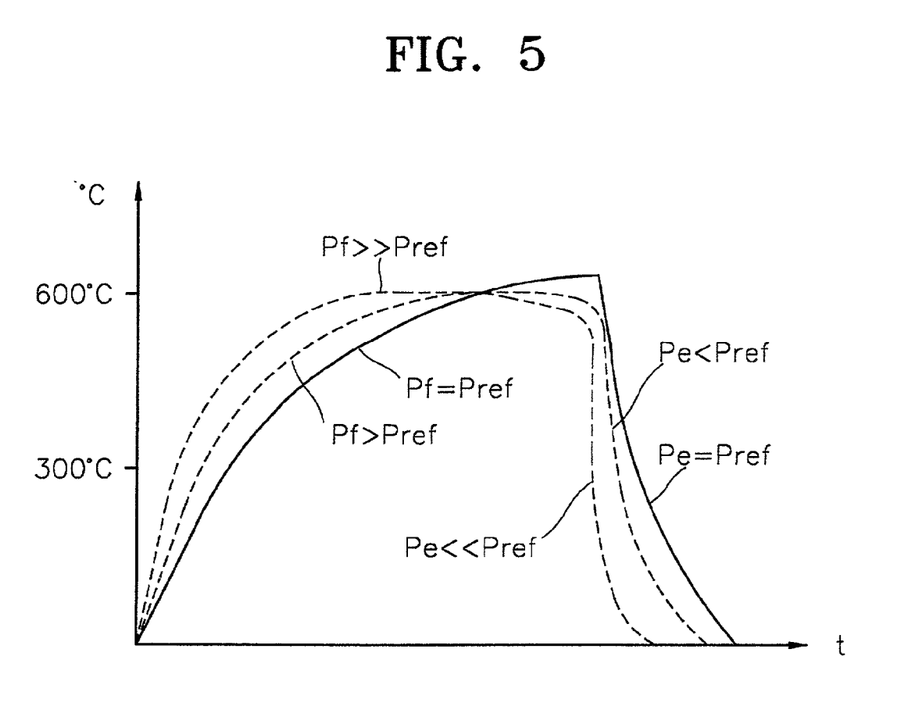
FIG. 5 graphically shows a recording control method according to the present invention.

FIG. 5 graphically shows a recording method according to the present invention. With reference to a graph shown in FIG. 5, a temperature change when the power level $P_f$ of a first pulse $T_f$ is equal to a reference power level $P_{ref}$ is shown with a portion of a solid line having a positive slope, and a temperature change when the power level $P_f$ of the first pulse $T_f$ is higher than the reference power level $P_{ref}$ is shown with a dotted line slightly displaced from the solid line. Also, a temperature change when the power level $P_f$ of the first pulse $T_f$ is much higher than the reference power level $P_{ref}$ is shown with a dotted line displaced even more from the solid line. In this case, as the power level $P_f$ of the first pulse $T_f$ becomes greater than the reference power level $P_{ref}$, a slope of temperature change becomes greater.

Furthermore, in FIG. 5, a temperature change when the power level $P_l$ of a last pulse $T_l$ is equal to the reference power level $P_{ref}$ is shown with a portion of a solid line having a negative slope, and a temperature change when the power level $P_l$ of the last pulse $T_l$ is lower than the reference power level $P_{ref}$ is shown with a dotted line right below the solid line. Also, a temperature change when the power level $P_l$ of the last pulse $T_l$ is much lower than the reference power level $P_{ref}$ is shown with the lowest dotted line. In this case, as the power level $P_l$ of the last pulse $T_l$ becomes less than the reference power level $P_{ref}$, the rate of cooling increases.

The shape of the trailing edge is determined by the slope of a temperature change on the trailing edge of the domain. That is, the shape of the trailing edge is improved by adjusting the slope of a temperature change, i.e., the power level $P_l$ of the last pulse $T_l$.

Table 1 shows the type of adaptive recording control method according to the present invention.

TABLE 1

| | b2 | b1 | b0 | Type of adaptive power control |
|---|---|---|---|---|
| AP_type | 0 | 0 | 0 | Changed depending on combination of previous space and current mark by applying adaptive power only to first pulse |
| | 0 | 0 | 1 | Changed depending on combination of current mark and next space by applying adaptive power only to last pulse |
| | 0 | 1 | 0 | Changed depending on size of current mark by applying adaptive power only to first and last pulses |
| | 0 | 1 | 1 | Changed depending on size of current mark by applying adaptive power to first, last, and multi pulses |
| | 1 | 0 | 0 | Changed by applying different power to first, last and multi pulses instead of applying adaptive power control |
| | 1 | 0 | 1 | Changed depending on combination of previous space and current mark by applying adaptive power control to first pulse and adjusted depending on combination of current mark and next space by applying adaptive power control to last pulse. Three different adaptive power levels provided. |
| | 1 | 1 | 0 | Changed depending on size of current mark by applying adaptive power control to last pulse. |
| | 1 | 1 | 1 | Consisting of first, last and multi pulses of different adaptive power levels. Changed depending on size of current mark by applying adaptive power level to entire write power. |

AP_type in Table 1 denotes the type of adaptive recording power control method, which is represented by 3 bits b2, b1, and b0.

As shown in Table 1, adaptive recording power control is applied independently to a first pulse, a multi-pulse, and a last pulse. For example, adaptive power control can be applied only to the first pulse (first case in Table 1), only to the last pulse (second case in Table 1), and independently to the first and last pulses (third case in Table 1). Furthermore, different adaptive power controls can be applied to the first pulse, the multi-pulse, and the last pulse (fourth case in Table 1). Also, it is possible to change a reference power level depending on the energy of an NRZI signal (eighth case in Table 1).

Figure 6A:
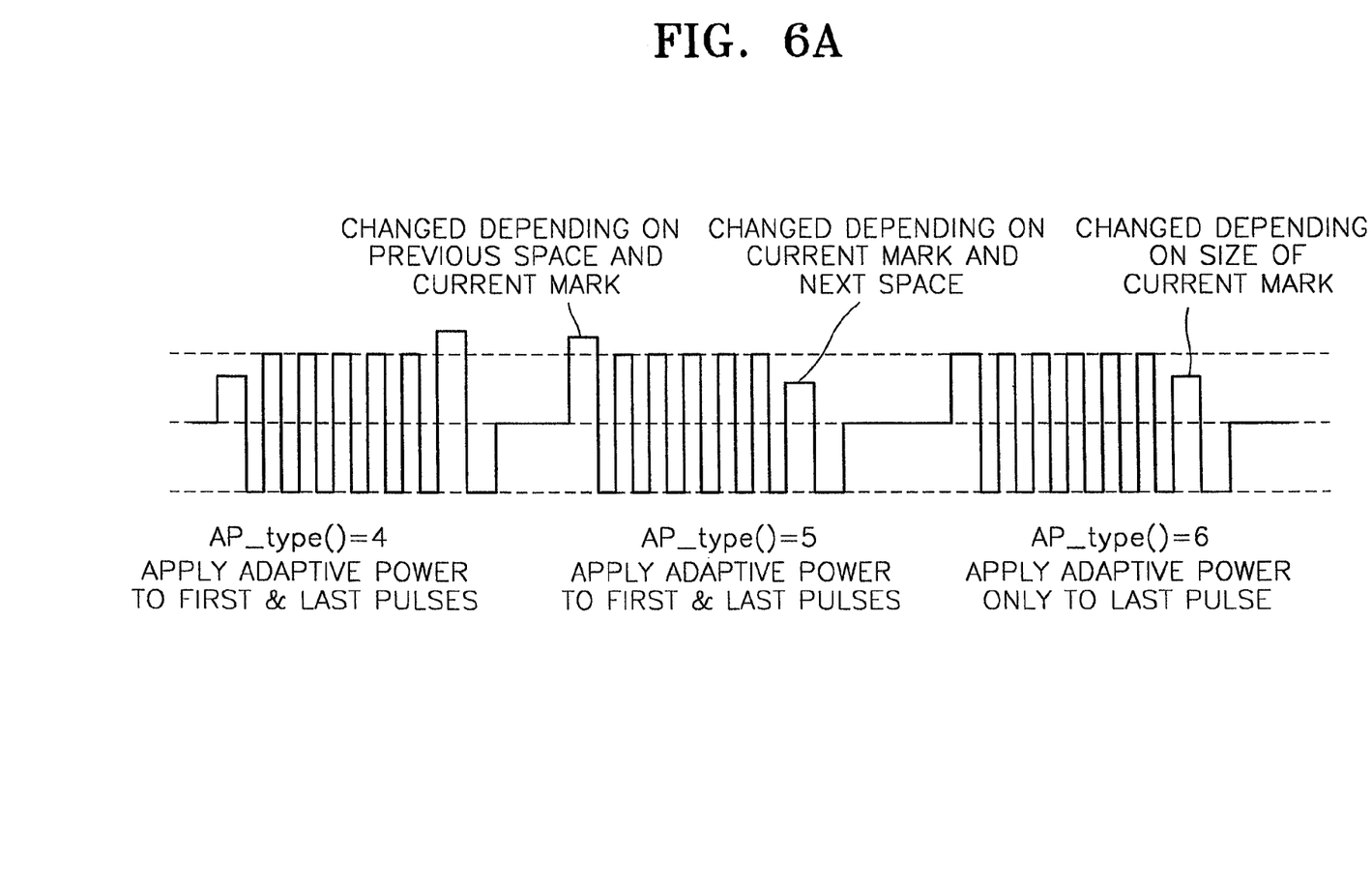
FIGS. 6A and 6B are waveforms of multiple pulse trains when a recording control method according to the present invention is used.

FIGS. 6A and 6B are waveforms of multiple pulse trains when a recording control method according to the present invention is used. Referring to FIG. 6A, in a first multiple pulse train, a first pulse, a multi-pulse, and a last pulse have different power levels depending on the size of a current mark as set forth in a fifth case of Table 1. In a second multiple pulse train, an adaptive recording control method is applied to first and last pulses as set forth in a sixth case of Table 1. In a third multiple train, the power level of a last pulse is set depending on the size of a current mark.

A reference power level is greater than that of the first pulse and less than that of the last pulse in the first pulse train, while the reference power level is greater than that of the last pulse and less than that of the first pulse in the second pulse train. In the third pulse train, the reference power level is greater than that of the last pulse and equal to that of the first pulse. In this way, an adaptive recording method according to the present invention makes it possible to make the power levels of first and last pulses $T_f$ and $T_l$ higher or lower than a reference power level, thereby providing improved recording control.

Figure 6B:
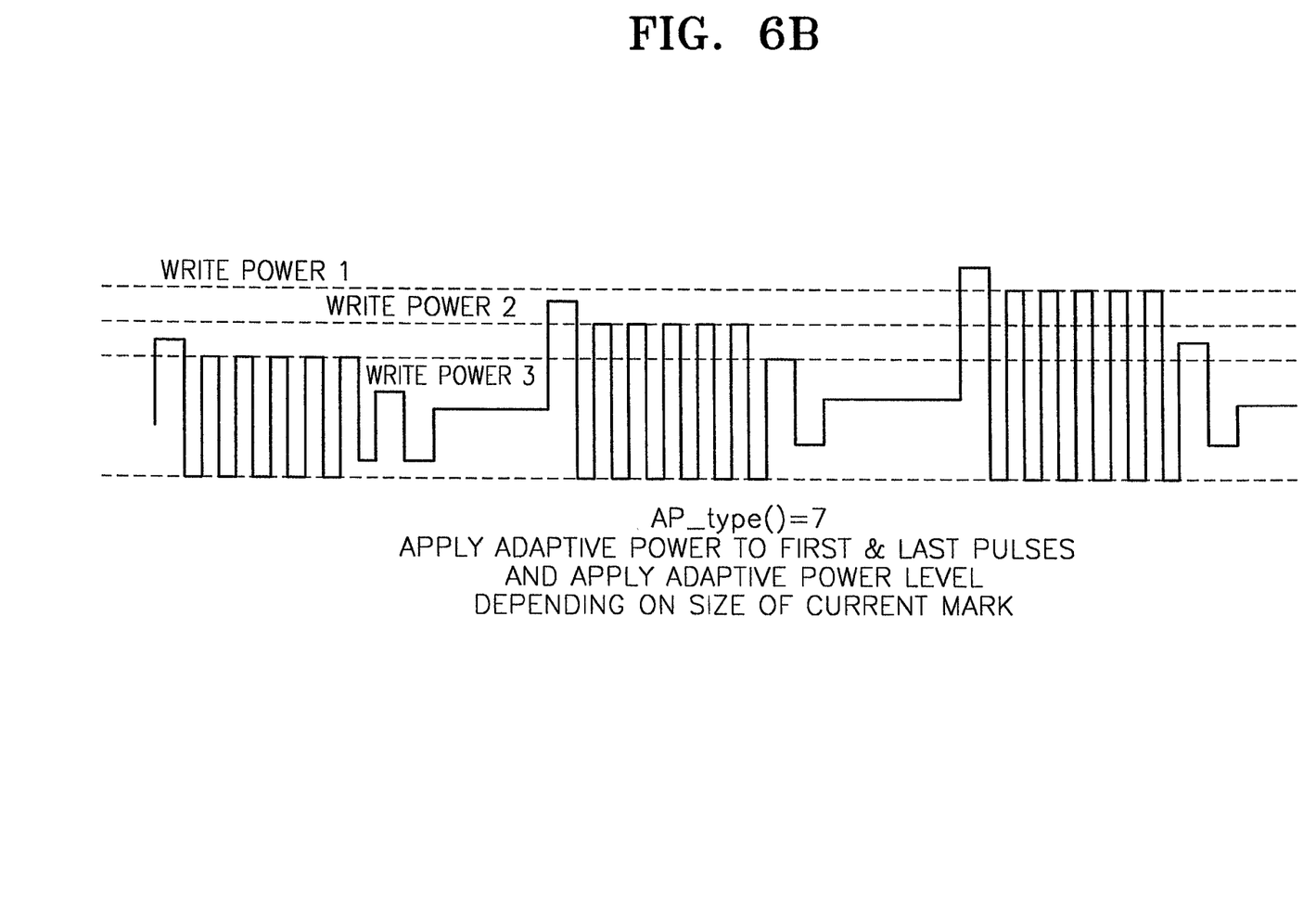

With reference to the waveforms of FIG. 6B, each multiple pulse train has a different reference power level. The reference power level of the first multiple pulse train is the lowest, whereas that of the third multiple pulse train is the highest. This reference power level is determined by the energy of an NRZI signal. That is, the reference power level varies depending on the energy or density of the NRZI signal. Here, the density refers to the number at which patterns 0 and 1 change each other.

A recording method according to the present invention performs adaptive recording control independently on a first pulse, a multi-pulse, and a last pulse, thereby controlling the power levels of the first pulse, the multi-pulse, and the last pulse more elaborately, compared to a conventional adaptive recording control method. Furthermore, the present invention makes the power levels of first and last pulses higher or lower than a reference power level, thereby effectively controlling the shape of a domain. The recording control method according to the present invention can be applied to recording media of higher density than digital versatile disks (DVDs) as well as to DVDs.

Figure 7:
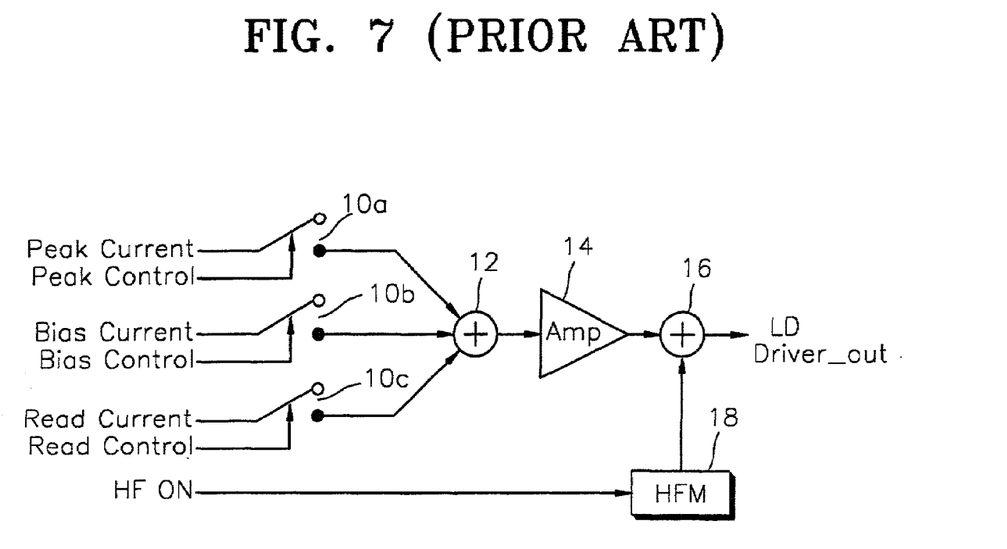
FIG. 7 is a block diagram showing the configuration of a conventional laser diode (LD) driver.

FIG. 7 is a block diagram showing the configuration of a conventional laser diode (LD) driver. Referring to FIG. 7, the LD driver includes switches 10a-10c, a multiplexer 12 multiplexing the outputs of the switches 10a-10c, an amplifier 14 amplifying the output of the multiplexer 12 with a predetermined degree of amplification, an adder 16, and a high frequency modulator (HFM).

Current or voltage, such as peak current, bias current, and read current corresponding to the power levels, such as the peak power level, the bias or erase power level, and the read power level of the LD, is applied to the switches 10a, 10b and 10c, respectively. The power levels are turned on or off by control signals such as peak control, bias control, and read control.

The outputs of the switches 10a-10c are multiplexed by the multiplexer 12. The output of the multiplexer 12 has the same waveform as that of a recording pulse applied to a recording medium through an LD (not shown). However, since the LD cannot be fully driven only by the output of the multiplexer 12, the output of the multiplexer 12 is amplified through the amplifier 14 and then output to the LD.

A high frequency modulating signal eliminating optical interference noise due to an optical pick-up (not shown) is generated by the HFM 18. The high frequency modulating signal is added to the output of the amplifier 14 through the adder 16. An LD (not shown) generates a recording signal corresponding to the output of the adder 16. Here, the high frequency modulating signal is set to have the most effective frequency and amplitude in order to remove the optical interference noise, and is mainly used in a read mode.

In the apparatus shown in FIG. 7, the number of switches can be 2 to 5 according to the number of channels used (the number of control signals)

Figure 8A:
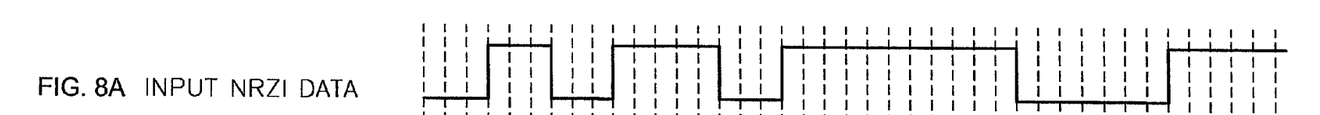
FIGS. 8A-8F show the conventional relationship between a recording signal and power control signals.
Figures 8B, 8C, 8D:
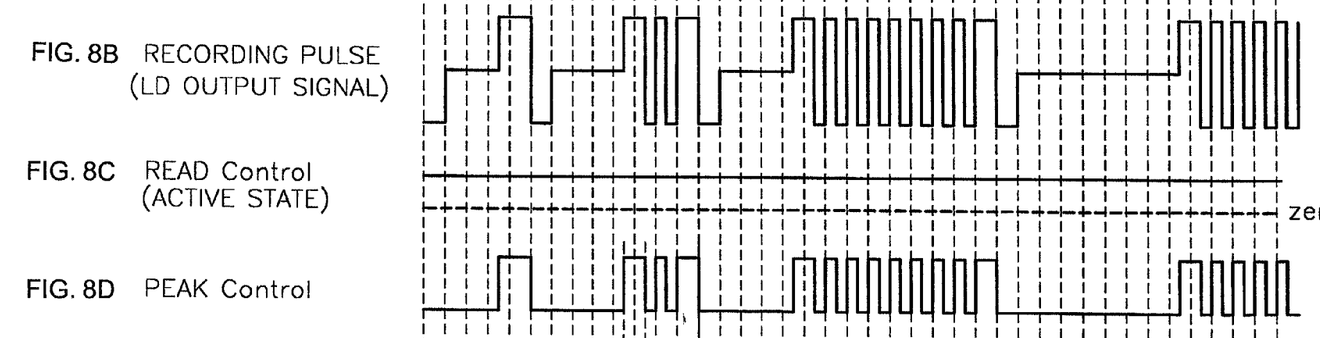
Figure 8E:
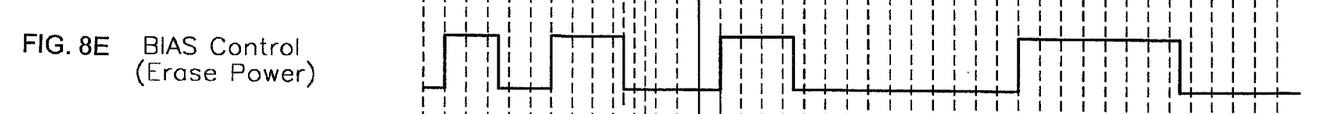
Figure 8F:
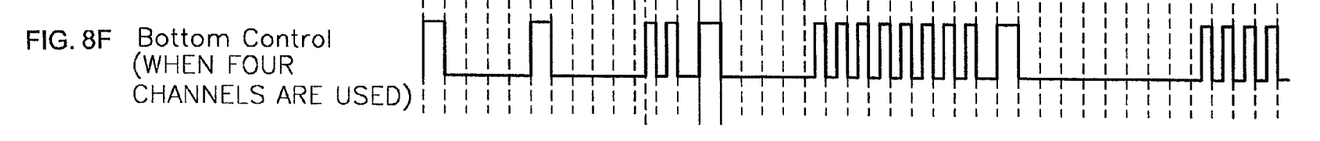

FIGS. 8A-8F show the conventional relationship between a recording signal and power control signals. FIG. 8A shows input NRZI data, FIG. 8B shows a write pulse output from an LD, FIG. 8C and FIG. 8D show a read control signal and a peak control, respectively, and FIG. 8E and FIG. 8F show bias control signals. In particular, a bottom control signal has a waveform as shown in FIG. 8F when four channels are used.

In order to perform an adaptive recording control method according to the present invention, a first or last pulse $T_f$ or $T_l$ in a write pulse needs to be controlled with at least three levels. Referring to FIGS. 8A-8F, a power control signal corresponding to the first and last pulses $T_f$ and $T_l$ is a peak control. However, since the peak control is a binary signal that can control only two levels, a separate signal needs to be generated based on the peak control in order to control the first or last pulse $T_f$ or $T_l$ with at least three levels.

For example, in controlling the power level of a first pulse $T_f$, three power levels such as peak power $P_w$, power $P_{wh}$ higher than peak power $P_w$, and power $P_{wl}$ lower than the peak power $P_w$ (see FIGS. 1A and 1B) should be provided at the location of the first pulse $T_f$. That is, additional two levels of power $P_{wh}$ and $P_{wl}$ should be provided to the switch 10a shown in FIG. 7, and select signals selecting one of the three levels $P_w$, $P_{wh}$, and $P_{wl}$ should be applied at the location of the first pulse $T_f$.

In controlling the power level of the last pulse $T_l$, select signals selecting one of the three levels should be applied at the location of the last pulse $T_l$. That is, a signal selecting one of the three levels $P_w$, $P_{wh}$, and $P_{wl}$ is further provided at the location of the last pulse $T_l$. The select signal can be easily generated by a pulse generator generating a laser power control signal.

However, since the LD driver of FIG. 7 is generally used, it is preferable to vary the level of power applied to the switch 10a among $P_w$, $P_{wh}$, and $P_{wl}$ rather than to adopt a new configuration having a select terminal receiving select signals to select one of the three levels $P_w$, $P_{wh}$, and $P_{wl}$ at the location of the first pulse $T_f$. That is, it is preferable that a laser diode output control circuit located at the front end of the LD driver applies the three levels $P_w$, $P_{wh}$, and $P_{wl}$ at the location of the first pulse $T_f$.

Figure 9:
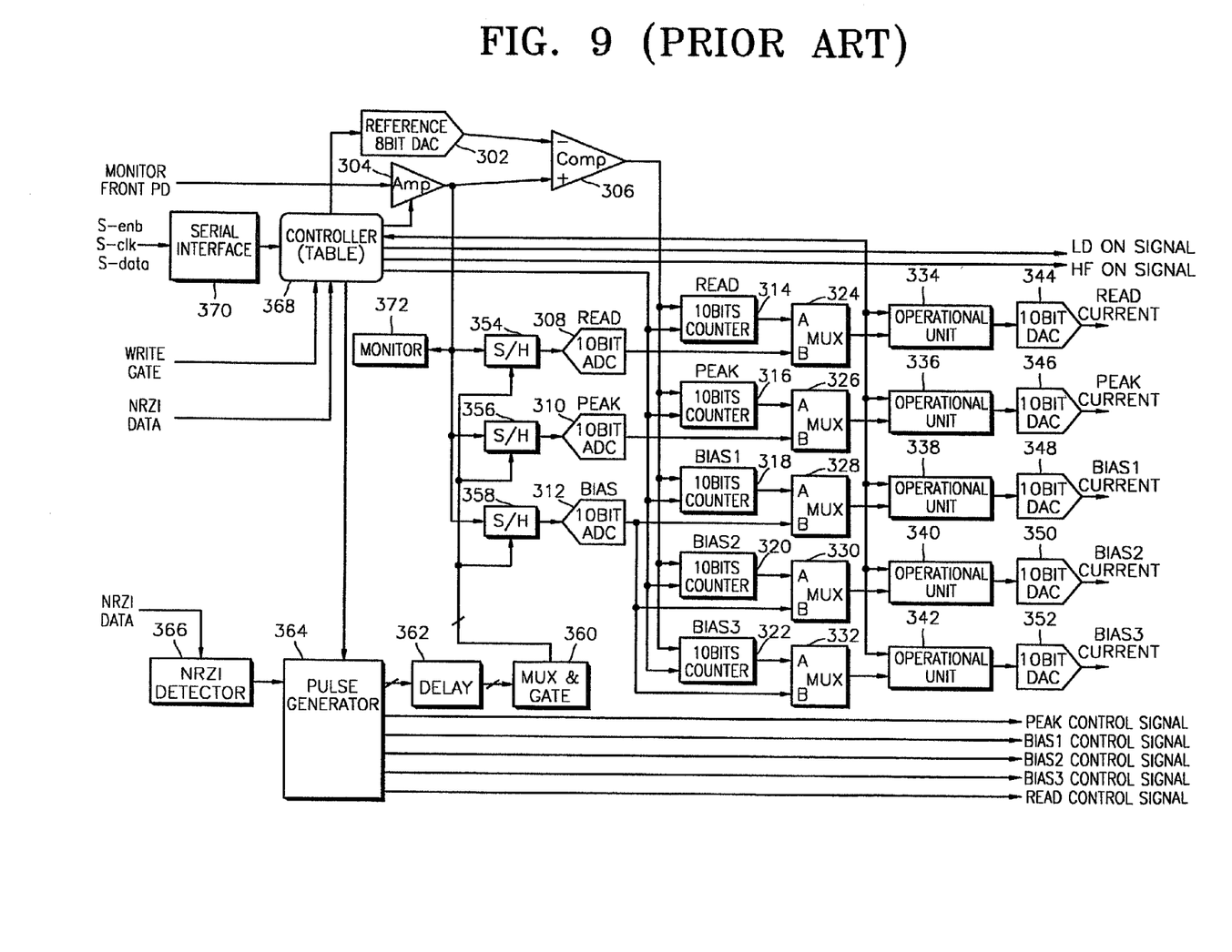
FIG. 9 is a block diagram showing the configuration of a conventional automatic power control (APC) circuit.

FIG. 9 is a block diagram of an automatic power control (APC) circuit. Referring to FIG. 9, the APC circuit includes a reference digital-to-analog converter (DAC) 302, a switching amplifier 304, a comparator 306, analog-to-digital converters (ADCs) 308 through 312, up/down counters 314 through 322, multiplexers (MUXs) 324 through 332, operational units 334 through 342, DACs 344 through 352, sample & hold units (S/Hs) 354 through 358, a multiplexer & gate (MUX & GATE) 360, a delay 362, a pulse generator 364, an NRZI detector 366, a controller 368, serial interface 370, and a monitor 372.

The reference DAC 302 converts the reference power level, provided by the controller 368, into an analog value, and then provides the analog value to an inverting input terminal of the comparator 306.

The reference power level varies depending on a disc format such as CD, CD-R, DVD, DVD–RW, and DVD+RW, the type of a medium, and a manufacturing company and is provided to the controller 368 through the interface 370. The controller 368 stores the reference power level in the form of a table, reads contents stored in a table according to a disc format, the type of a medium, a manufacturing company, and an operation mode, and provides the contents stored in the table to the reference DAC 302.

The switching amplifier 304 amplifies a photodiode signal according to a predetermined gain and provides the amplified photodiode signal to a non-inverting input terminal of the comparator 306. The output of the switching amplifier 304 represents the current power level. In FIG. 9, a monitor front PD signal denotes a photodiode signal that is the output of a photodiode PD. The switching amplifier 304 is a variable gain amplifier whose gain is non-linearly controlled. The gain of the switching amplifier 304 is set according to an operation mode and whether the recording surface of a disc is a land or a groove.

The comparator 306 compares the reference power level provided by the reference DAC 302 with the current power level provided by the switching amplifier 304 and outputs a value of 0 or 1 according to the comparison result. The output of the comparator 306 is provided to the up/down counters 314 through 322. The up/down counters 314 through 322 perform up-count or down-count operation according to the comparison result of the comparator 306. The initial set values of the up/down counters 314 through 322 are provided from the controller 368 and are slightly different from the reference power level. It is preferable that the difference between the initial set level and the reference power level is small so that the current power level traces the reference power level quickly. However, the difference between the initial set level and the reference power level is preferably determined according to the gain and the response speed of related circuits.

The multiplexers 324 through 332 select one among two feedback loops as described below. The operational units 334 through 342 perform operation on the mean value of the sampled current power levels, perform operation on the difference between the mean value and the reference power level, control the power level, and maintain the result of operations. The DACs 344 through 352 convert the outputs of the operational units 334 through 342 into analog values and provide the analog values to an LD driver (not shown) as shown in FIG. 7.

The sample & hold units 354 through 358 sample and hold the photodiode signal output from the switching amplifier 304. The outputs of the sample & hold units 354 through 358 are analog-to-digital converted through the ADCs 308 through 312 and provided to the operational units 334 through 352 through the multiplexers 324 through 332.

The multiplexer & gate 360 generates a sample & hold control signal controlling the sampling and holding operation of the sample & hold units 354 through 358. Although not shown, multiplexers and gates 360a, 360b, and 360c include multiplexers and logic gates.

The multiplexer of the multiplexer & gate 360 selects one or a plurality of signals among the delayed read control signal, the delayed peak control signal, the delayed bias1 control signal, the delayed bias2 control signal, and the delayed bias3 control signal, which are provided by the delay 362. The gate of the multiplexer & gate 360 performs a logic combination on the output of the multiplexer and generates a sample & hold control signal. The simplest form of the gate is an AND gate.

The delay 362, including a plurality of delay elements, delays and outputs the read control signal, the peak control signal, the bias1 control signal, the bias2 control signal, and the bias3 control signal, all of which are generated by the pulse generator 364.

A section to sample can be easily selected by the operations of the delay 362 and the multiplexer & gate 360. A desired portion of the fed back photodetector signal can be sampled using this section.

The pulse generator 364 generates the read control signal, the peak control signal, the bias1 control signal, the bias2 control signal, and the bias3 control signal. The starting/ending position and the pulse width of each signal are determined by the NRZI detector 366.

The NRZI detector 366 receives the NRZI signal and detects correlation between the current mark and each of previous and next spaces. The detection result is provided to the pulse generator 364 and determines the starting/ending position and the pulse width of each control signal.

The controller 368 provides the reference power level received through the serial interface 370 to the reference DAC 302 and the operational units 334 through 342, and sets the initial values of the up/down counters 314 through 322. The controller 368 controls the gain of the switching amplifier 304, the switching positions of the multiplexers 324 through 332, and the operation modes of the operational units 334 through 342 according to the operation mode, the type of a medium, a disc format, and information about whether the recording surface of a disc is a land or a groove. The monitor 372 monitors the current power level output from the switching amplifier 304 and performs interrupt to be generated by the current power level.

Here, the pulse generator 364 generates the read control signal, the peak control signal, and the bias control signals required in generating a recording pulse, referring to correlation between the current mark and each of the previous and next spaces detected by the NRZI detector 366. Furthermore, the starting/ending position and the pulse width of each control signal are determined according to the correlation detected by the NRZI detector 366.

An adaptive recording control apparatus according to the present invention will be devised from the automatic power control circuit (APC) of FIG. 9 as follows. That is, a select signal selecting $P_w$, $P_{wh}$, or $P_{wl}$ can be generated during a first or last pulse $T_f$ or $T_l$ referring to the peak control signal output from the pulse generator 364.

The operational unit 336 may be designed to determine an optimum peak power $P_w$ and generate the other two power levels $P_{wh}$, or $P_{wl}$ by adding or subtracting a predetermined value to or from the optimum peak power $P_w$. Then, a multiplexer selectively outputting $P_w$, $P_{wh}$, or $P_{wl}$ output from the operational unit 336 can be provided, and the selection operation of the multiplexer can be controlled by the select signal generated by the pulse generator 364, thereby enabling one of $P_w$, $P_{wh}$, or $P_{wl}$ to be selectively applied at the location of the first or last pulse $T_f$ or $T_l$.

Figure 10:
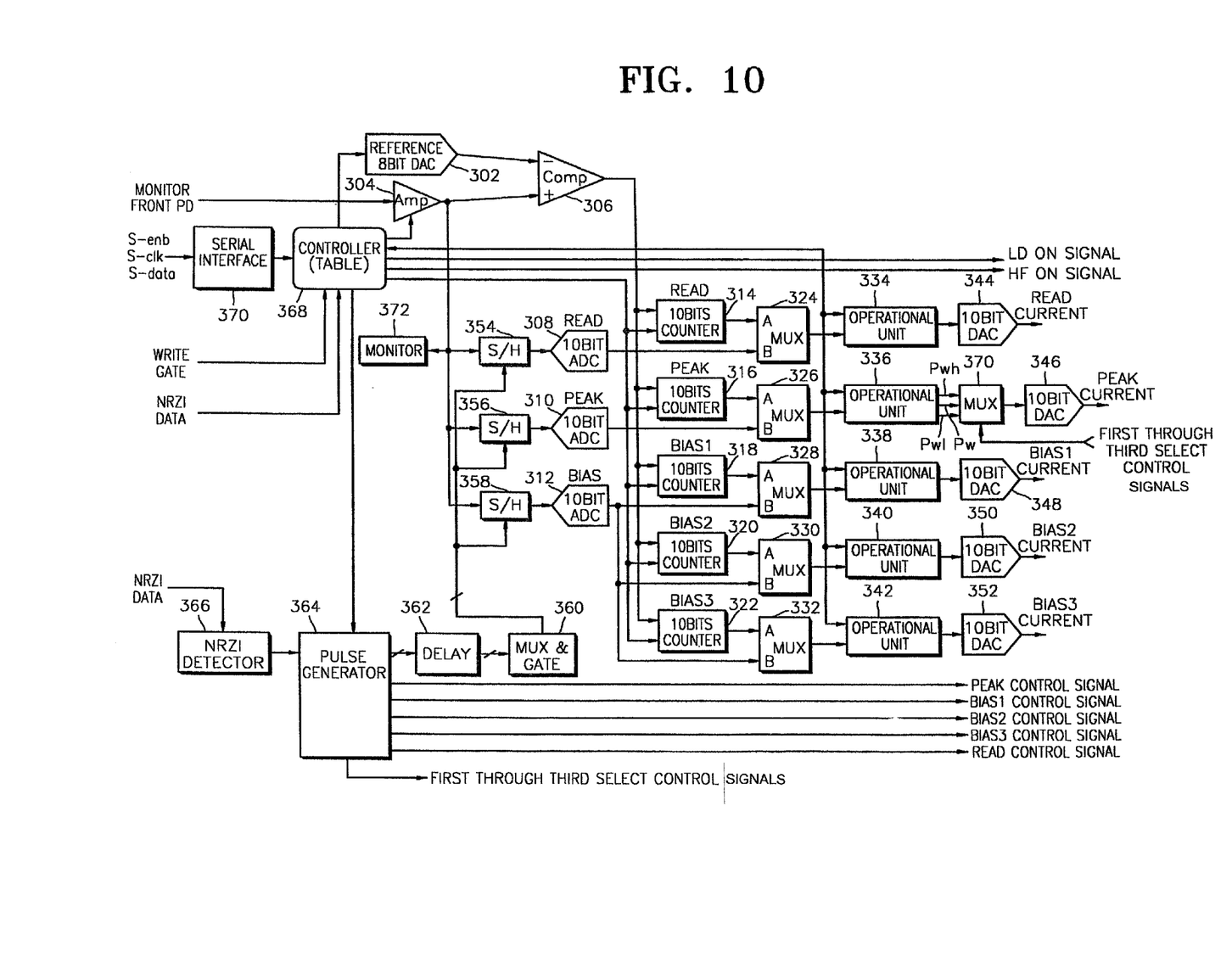
FIG. 10 is a block diagram showing the configuration of an APC circuit according to the present invention.

FIG. 10 is a block diagram of an APC circuit according to the present invention. As described above, the APC circuit of FIG. 10 is different from the counterpart of FIG. 9 in that the second operational unit 336 outputting peak current outputs at three levels $P_w$, $P_{wh}$, or $P_{wl}$ and a multiplexer 370 multiplexing these outputs is further provided. Additionally, first through third select control signals are applied to the multiplexer 370.

Here, the first through third select control signals control the operations of outputting power levels $P_{wh}$, $P_w$, and $P_{wl}$ at the location of a first or a last pulse $T_f$ or $T_l$, respectively. The first through third select control signals are generated in the pulse generator 364 and output to the multiplexer 370. The pulse generator 364 determines which one of the waveforms shown in FIG. 6B is output, referring to the correlation detected by the NRZI detector 366, and outputs a corresponding select control signal. The first through third select control signals are generated at the locations of the first and last pulses $T_f$ and $T_l$.

Figure 11A:
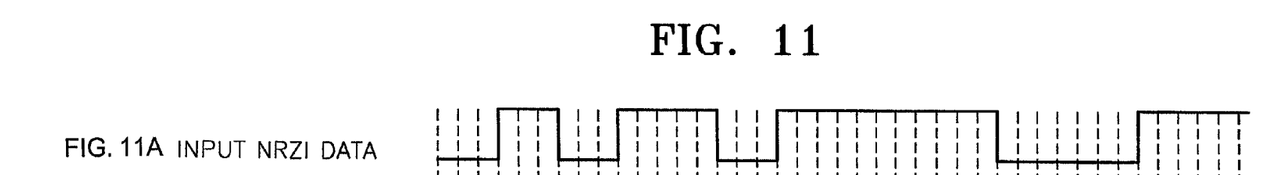
FIGS. 11A-11B are timing diagrams showing timing of pulse signals generated by the pulse generator of FIG. 10.
Figure 11B:
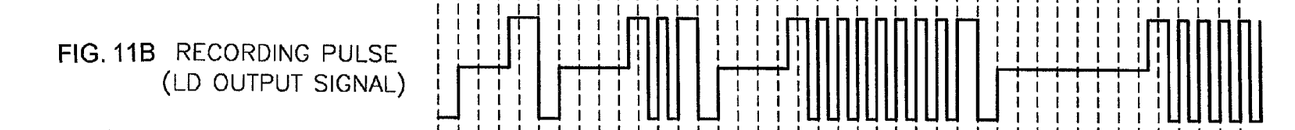
Figure 11C:
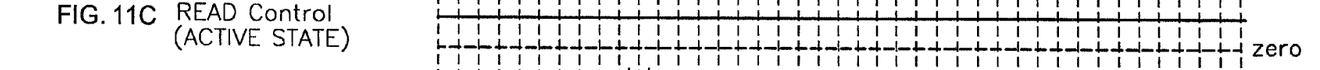
Figure 11D:
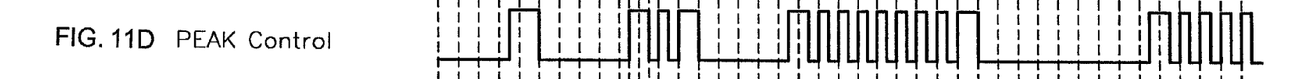
Figure 11E:
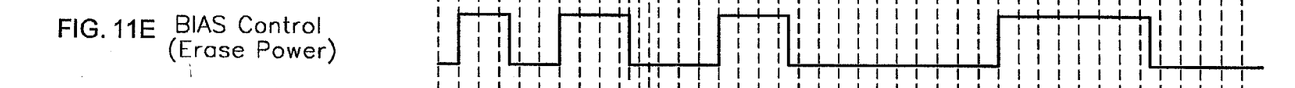
Figure 11F:
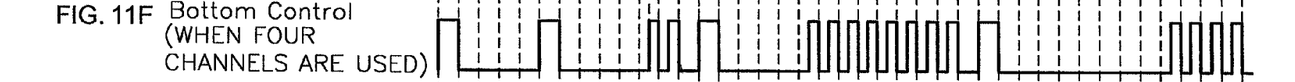
Figure 11G:
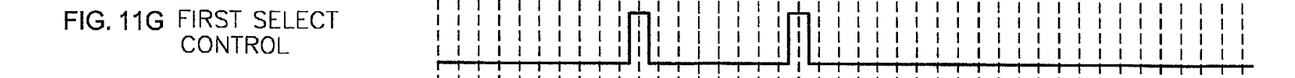
Figure 11H:
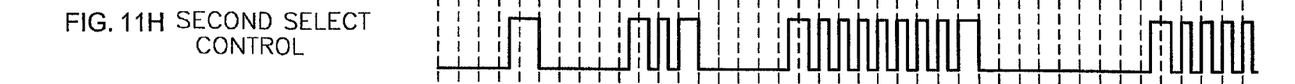
Figure 11I:
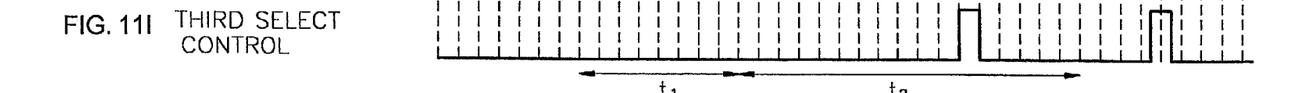

FIGS. 11A-11I show the timing of pulse signals generated by the pulse generator 364 of FIG. 10. FIG. 11A shows input NRZI data, FIG. 11B shows a recording pulse output from an LD, FIG. 11C and FIG. 11D show a read control signal and a peak control signal, respectively, FIG. 11E and FIG. 11F show bias control signals (bias control signal and bottom control signal), and FIGS. 11G, 11H, and 11I show first through third select control signals, respectively. Here, the waveform of the second select control signal is the same as that of a peak control signal.

The first select control signal indicates whether or not the power level $P_{wh}$ output from the second operational unit 336 is selected. The third select control signal indicates whether or not the power level $P_{wl}$ output from the second operational unit 336 is selected.

In the multiplexer 370, the first and third select control signals have priority over the second control signal. That is, if the first or third select control signal is generated, the second control signal is ignored.

Since the first and second select control signals are exclusively generated, priority is not important between them.

In FIGS. 11A-11I, during a first pulse $T_f$ of an interval t1, the first and third select control signals are in high and low states, respectively. During a last pulse $T_l$, the first and third select control signals are in low states. That is, the power levels of the first and last pulses $T_f$ and $T_l$ are $P_{wh}$ and $P_w$ during the interval t1, respectively. During a first pulse $T_f$ of an interval t2, the first and third select control signals are in high and low states, respectively. During a last pulse $T_l$, the first and third select control signals are in low and high states, respectively. That is, the power levels of the first and last pulses $T_f$ and $T_l$ are $P_{wh}$ and $P_w$ during the interval t2, respectively.

As described above, the recording method according to the present invention improves the quality of a recorded signal so that adaptive control can be performed independently on a first pulse, a last pulse, and a multi-pulse comprising a multiple pulse train. Furthermore, the present invention makes the power levels of the first and last pulses higher or lower than a reference power level, thereby effectively controlling the shape of a domain and improving the recording quality.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling recording a signal on an optical disc, the method comprising:
providing a multiple pulse train for recording a mark on the optical disc, the multiple pulse train comprising a first pulse, a multi-pulse having a reference power level, and a last pulse; and
controlling a power level of said last pulse independent of a power level of said first pulse,
wherein said last pulse is a different power level than said first pulse in a third multi-pulse train.

2. The method according to claim 1, wherein the power levels of the first and last pulse are controlled by selecting a peak power level $P_w$, a power $P_{wh}$ higher than the peak power level $P_w$, or power $P_{wl}$ lower than the peak power level $P_w$.

3. The method according to claim 2, wherein $P_w$ is an optimum peak power level and $P_{wh}$ and $P_{wl}$ are generated by adding or subtracting a predetermined value to or from the optimum peak power level $P_w$, respectively.

4. The method according to claim 1, wherein said multi-pulse reference power level is greater than said first pulse power level and less than said last pulse power level.

5. A method of controlling recording marks on an optical disc using multiple pulse trains comprising first, second and third multi-pulse trains each having a first pulse, a multi-pulse having a reference power level, and a last pulse, the method comprising:
providing a different reference power level to each multi-pulse train depending on the energy or density of a non-return-to-zero inverted (NRZI) signal based on a correlation between a current mark and a space between successive marks,
wherein the power level of the first and last pulse of each of said first, second and third multi-pulse trains is higher or lower than said reference power level and a power level of a last pulse in the third-multi-pulse train is different than a first pulse of the third multi-pulse train.

6. The method according to claim 1, wherein the power level of said multi-pulse is controlled independent of the power level of said first pulse and the power level of said last pulse.

7. A method of forming a mark on an optical recording medium, the method comprising:
generating a recording pulse train comprising a first pulse, a multi-pulse having a peak power level, and a last pulse;
adapting a power level of at least one of the first pulse and the last pulse relative to a peak power level of the multi-pulse depending on a correlation between the mark and one of a previous space and a next space, respectively, wherein an adapting of the power level of the first pulse is independent of an adapting of the power level of the last pulse; and
driving a recording unit with the recording pulse train to record the mark on the optical recording medium,
wherein a power level of both the first pulse and the last pulse of a first multi-pulse in multiple pulse trains is adapted and a power level of only a last pulse of a third multi-pulse in the multiple pulse trains is adapted.

8. The method of claim 7, further comprising: adapting the peak power level of the multi-pulse depending on a size of the mark.

9. A method of forming a mark on a recording medium in response to an NRZI signal defining a current mark, a previous space and a next space, the method comprising:
determining a correlation between the current mark and the previous space;
determining a correlation between the current mark and the next space;
determining a size of the current mark;
generating a recording pulse train for the current mark comprising a first pulse, a multi-pulse having a peak power level, and a last pulse;
adapting the recording pulse train for the current mark by selecting one of a plurality of recording pulse variations based on the correlations and the current mark size, the plurality of recording pulse variations comprising:
adapting only the first pulse depending on the correlation between the current mark and the previous space,
adapting only the last pulse depending on the correlation between the current mark the next space,
adapting the first and last pulses depending on the size of the current mark,
adapting the first pulse, the multi-pulse and the last pulse depending on the size of the current mark, adapting the first pulse, the multi-pulse and the last pulse to correspond to predetermined power levels without regard to the correlations or the size of the current mark, adapting the first pulse based on the correlation between the previous space and the current mark and adapting the last pulse based on the correlation between the current mark and the next space, adapting only the last pulse depending on the size of the current mark, and adapting the first and last pulses relative to the multi-pulse depending on the correlations and adapting the multi-pulse power level relative to a predetermined value depending on the size of the current mark; and driving a recording unit with a recording pulse train adapted according to the selected pulse train variation to record the current mark on the optical recording medium.

* * * * *